July 16, 1963 M. H. COMER Re. 25,416

STRETCH YARN AND FABRIC AND METHOD OF MAKING SAME

Original Filed Oct. 31, 1955 2 Sheets-Sheet 1

MARVIN H. COMER, INVENTOR.

BY James W. Graves

ATTORNEY

STRETCH YARN AND FABRIC AND METHOD OF MAKING SAME

Original Filed Oct. 31, 1955 2 Sheets-Sheet 2

INVENTOR:
MARVIN H. COMER
BY James W. Grant
ATTORNEY

United States Patent Office

Re. 25,416

Reissued July 16, 1963

25,416

STRETCH YARN AND FABRIC AND METHOD OF MAKING SAME

Marvin H. Comer, Burlington, N.C., assignor, by mesne assignments, to Alamance Industries, Inc., Burlington, N.C., a corporation of North Carolina Original No. 2,777,310, dated Jan. 15, 1957, Ser. No. 544,049, Oct. 31, 1955. Application for reissue Aug. 29, 1957, Serial No. 687,845

34 Claims. (Cl. 66—180)

Matter enclosed in heavy brackets [ ] appears in the original patent but forms no part of this reissue specification; matter printed in italics indicates the additions made by reissue.

This invention relates to composite or multi-ply yarns and, more especially, to an improved predominately cotton stretch yarn and the method of producing same as well as to a novel stretchable fabric made from the yarn.

It is an object of this invention to provide an improved composite yarn comprising one or more cotton strands loosely curled or twisted around one or more synthetic thermoplastic stretchable strands resulting in a yarn which has the appearance and feel of cotton and which has substantial stretchable characteristics.

It is another object of this invention to provide a stretchable fabric made from the improved composite yarn which has the appearance and feel, as well as the light weight, of a fabric made only from cotton material and which has substantial stretchable characteristics.

Cotton yarns and fabrics produced therefrom have many desirable characteristics as compared to synthetic thermoplastic monofilament or multi-filament yarns or other silk-like yarns in that cotton fabric is of light weight, is easily dyed, has a soft hand and feel and has more body than a light weight fabric produced from silk-like yarns.

As is well known, there has been a heavy demand, in recent years, for synthetic thermoplastic yarns and the resultant fabric produced therefrom, particularly in the knitting industry, due to the successful development of processes for imparting stretchable characteristics to synthetic thermoplastic yarns or, at least, to the socks or stockings produced from these especially treated thermoplastic yarns. From a sales standpoint, however, particularly in the warmer regions, there is a much heavier demand for light weight cotton socks than there is for socks made entirely from synthetic thermoplastic yarns or entirely from wool yarns even though prior attempts to render cotton yarns and the resulting fabrics stretchable have not been effective due to the characteristics of cotton fibers. While stretchable socks made from nylon or other synthetic thermoplastic yarns have generally proved extremely popular, they have not been so popular in the lighter weights since it is difficult to control the stretch properly and most of such socks have too much stretchability.

The nature of the invention will be better understood as the description proceeds when taken in connection with the accompanying drawings, in which FIGURE 1 is an elevation of the composite yarn generally, showing the relationship of the cellulosic yarn to the synthetic yarn;

Figures 1, 2, 3:
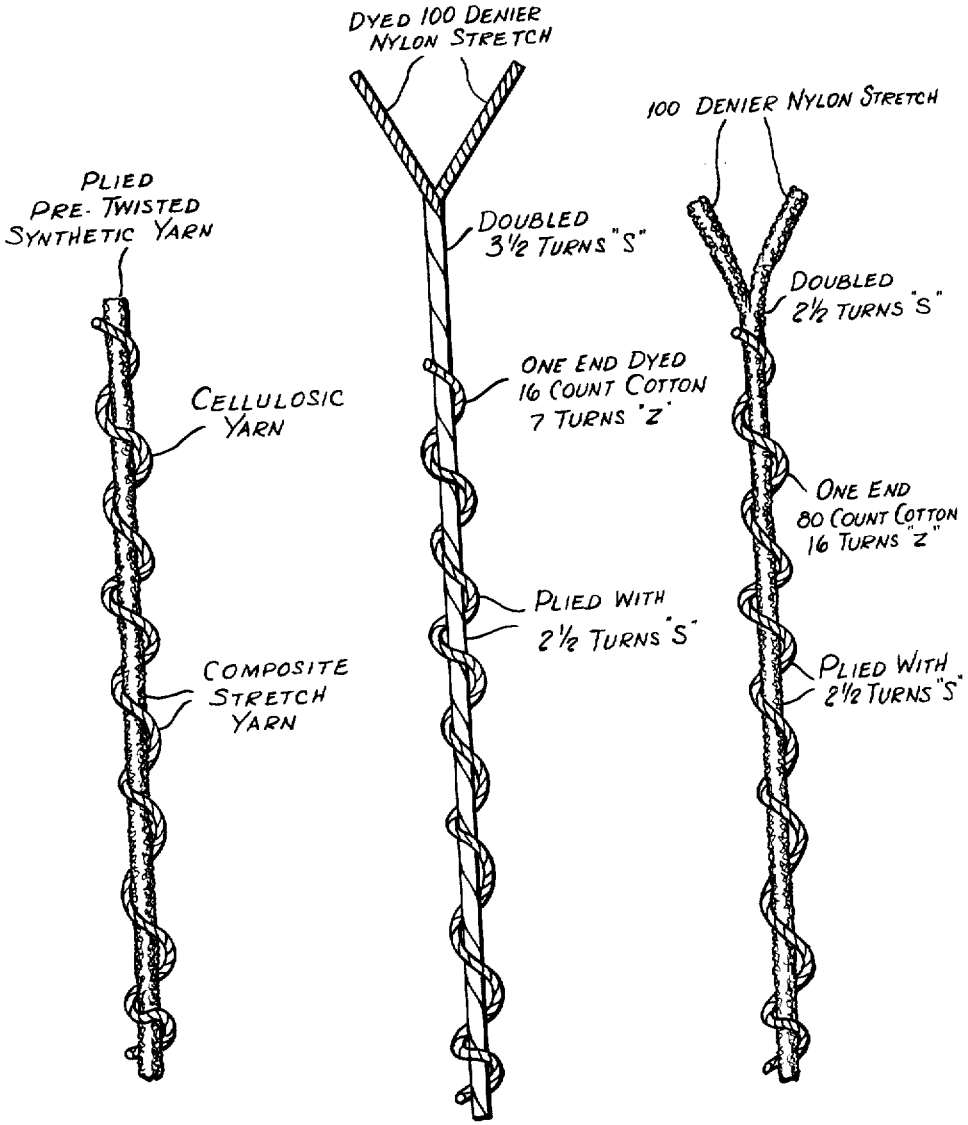
FIGURE 2 is an elevation of one form of composite yarn.
FIGURE 3 is an elevation of another form of composite yarn.

By combining cotton yarn with stretch nylon yarn or other stretchable synthetic thermoplastic yarns, according to the present method, there is produced a composite yarn which may or may not be made predominately from cotton but which, in either event, is predominately cotton in weight, feel and appearance. Fabric knit or woven from composite yarn of this character is light weight and has all the desirable features of light weight cotton fabric with the additional stretchable characteristics perculiar to fabrics produced solely from stretchable nylon yarn or other twisted synthetic thermoplastic yarns. Also, the resultant fabric has more body and is of lighter weight than stretchable fabrics made solely from nylon or other synthetic yarns and the stretchability thereof is reduced as compared to the stretchability of fabrics knit or woven from synthetic thermoplastic yarns. This is a highly desirable feature from the standpoint of wear.

The stretchable synthetic thermoplastic yarns are preferably of the so-called super twisted type wherein multi-filament strands are twisted and then set and then untwisted. *The resulting strand, if untwisted merely to zero, will have a final twist equal to the amount of twist present in the yarn prior to the supertwisting operation, i.e., "producer's twist." If the strand is untwisted beyond zero, it will have an additional amount of final twist normally ranging from 1 to 4 turns as desired. Such yarns or strands may be used individually or* [and possibly] plied with additional multi-filament strands treated in the same manner as the other strands but generally twisted in the opposite direction from that in which the other strands are twisted. Alternatively, the stretchable synthetic thermoplastic yarns may include single strands of multi-filament yarn which have been supertwisted, crimped, curled or otherwise rendered stretchable as is well known in the art.

The process according to the present invention will be better understood from the following description of practical embodiments thereof given solely by way of example:

EXAMPLE I

One end of 16 count cotton is dyed and given seven turns of Z-twist per inch [(left-hand twist)]. This end of cotton yarn is then plied (FIGURE 2) with two ends of 100 denier nylon stretch yarn which ends have been dyed in muffs (loosely wound packages) and subsequently doubled at three and one-half turns of S-twist per inch [(right-hand twist)]. It should be noted that each of the ends of 100 denier nylon yarns are, prior to being doubled, subjected to a twisting and heat-setting process so that each nylon yarn has a latent twist or torque and inherent stretchable properties. The individual 100 denier nylon stretch yarns may be treated according to the so-called Helanca [, Agilon] or Brooks processes as disclosed in patents, such as Nos. 2,019,183; 2,019,185; 2,564,245; 2,585,518; 2,679,739 and others. The one end of cotton and the two ends of nylon stretch yarn are then plied and wound onto cones or bobbins during the course of which two and one-half turns of S-twist are imparted to the composite yarn thus formed. During the plying or doubling of the previously plied nylon stretch yarns with the cotton yarn, three and one-half percent oil (Nopoco No. 1056A) in proportion to the weight of the yarn is applied to the yarn to insure proper lubrication of the yarn during subsequent knitting and to assist in eliminating static electricity.

It will be noted that the cotton yarn in the above example is dyed separate from the nylon stretch yarn which places this composite yarn in the category of dyed yarn.

Dyed yarns are used in knitting fancy fabrics, such as argyle socks wherein the sock has variegated areas therein.

EXAMPLE II

Two ends of 100 denier nylon stretch yarn are doubled with two and one-half turns per inch S-twist being imparted thereto during the doubling operation (FIGURE 3). After the two ends of 100 denier nylon stretch yarn have been doubled, they are, in turn, doubled or plied with one end of 80 count cotton yarn to which 16 turns per inch of Z-twist have been previously imparted and, during the doubling or plying of the two ends of nylon stretch yarn with the single end of cotton yarn, two and one-half turns of S-twist per inch are imparted to the composite yarn thus formed in the course of which the composite yarn is also subjected to three and one-half percent oil in proportion to the weight of the yarn. It will be noted that the cotton and nylon stretch yarn of this example are not dyed and are, therefore, placed in the category of the natural yarns. Natural yarns are used in the knitting of white or solid color socks so the operation of dyeing the yarns individually is not required, since the resultant fabric knit from the natural yarns may be dyed after the knitting process, it merely being necessary that the particular dye stuff used have an affinity for both nylon or other synthetic stretch yarn and the cotton yarn.

In imparting the final twist to the plied yarns in both examples, the end of cotton yarn in each instance wraps around the nylon stretch yarn. Heretofore, it has been customary, in wrapping elastic or rubber yarn around a cotton or synthetic yarn, for example, to pass one of the strands through a hollow rotating spindle while bypassing the spindle with the other of the strands of yarn. However, in the present instance, the wrap-around effect is efficiently produced through the use of conventional accurately controlled tensioning devices wherein the cotton yarn is maintained at an average of five grams lesser tension than that in the nylon or synthetic thermoplastic stretch yarn during the final plying or doubling operation.

The relative amounts of twist imparted in the cotton and nylon stretch yarns prior to the doubling of the yarn in forming a composite yarn as well as accurate control of the tension in the two yarns is important in order to properly balance the resultant composite yarn and, accordingly, to prevent spiraling or coiling of the finished fabric but, more especially, in order to prevent the "piling up" of the yarn at the knitting wave of the knitting machine. This is an extremely pertinent problem since it is apparent that, in feeding the yarn into the knitting machine, if the cotton yarn, which is wrapped around the nylon or synthetic thermoplastic yarn, does not have the same pulling force thereon as the nylon, it would then tend to "back up" as the nylon feeds into the machine so that it would subsequently "pile up" as it reached the needles.

A substantial number of composite yarns may be made in accordance with the present invention from two or more ends of cotton yarn and nylon stretch yarn in which the cotton yarn may range in count from No. 12/1 to No. 80/1 and in which the nylon may be either of single ply stretch yarn or two ply stretch yarn and wherein the two ply stretch yarn may have a denier of from 50/2 to 300/2 and the single ply stretch yarn may have a denier of from 50/1 to 300/1. It might be stated here that the definition of the cotton yarn indicated at 12/1, for example, means that the cotton yarn has a count of 12 and that one strand of the cotton yarn is used while the definition of 50/2 for the nylon stretch yarn, for example, indicates that the yarn is of 50 denier and includes two strands of nylon stretch yarn which have been plied or doubled. *The amounts of twist in each of the component yarns of my invention may range up to 20 turns per inch in the cotton yarn and from zero to four turns per inch in each end of nylon stretch yarn present in the composite yarn. The twist in the cotton yarn preferably ranges from 5 to 20 turns per inch. Where the composite yarn includes two ends of nylon stretch yarn, these may be plied together with from two to four turns of twist per inch.*

Examples of other dyed composite yarns made according to the present invention are as follows:

(a) One end of 100 denier nylon stretch yarn is dyed after which three and one-half turns of S-twist per inch is imparted thereto, one end of 40/1 cotton yarn is dyed and sixteen turns of Z-twist per inch is imparted thereto and then the two ends of cotton yarn and nylon stretch yarn are plied or doubled during which two and one-half turns of S-twist per inch is imparted to the composite yarn thus formed while the yarn is subjected to approximately three and one-half percent oil in proportion to the weight of the yarn.

(b) One end of 100 denier nylon stretch yarn is dyed in muff form after which three and one-half turns of S-twist per inch is imparted thereto and this yarn is then doubled or plied with a single end of 50/1 cotton yarn which has been previously dyed and to which 16 turns of Z-twist per inch have previously been imparted and during the plying or doubling of the two cotton and nylon yarns, two and one-half turns of S-twist per inch is imparted thereto during which the composite yarn thus formed is also subjected to approximately three and one-half percent of oil in proportion to the weight of the composite yarn.

(c) One end of 100 denier nylon stretch yarn is dyed in muff form and subjected to three and one-half turns of S-twist per inch, one end of 60/1 cotton yarn is dyed and 16 turns of Z-twist per inch are imparted thereto; the two ends of cotton and nylon yarn are then doubled or plied while two and one-half turns of S-twist per inch is imparted thereto and during which the composite yarn thus formed is also subjected to oil for lubricating the same as heretofore stated.

Various other natural yarns which have been produced according to the present method are as follows:

[(a)] (*d*) Two ends of 100 denier nylon stretch yarn are plied together or doubled while two and one-half turns of S-twist per inch are imparted thereto, one end of 80/1 cotton yarn having 16 turns of Z-twist per inch is then plied with the two ends of nylon stretch yarn while imparting two and one-half turns of S-twist per inch to the composite yarn thus formed and while subjecting the yarn to oil for lubricating the same.

[(b)] (*e*) One end of 14/1 cotton yarn having 7 turns of Z-twist per inch previously imparted thereto is doubled or plied with one end of 100 denier nylon stretch yarn to which two and one-half turns of S-twist per inch have previously been imparted and, during the latter plying or doubling operation, two and one-half turns of S-twist is imparted to the composite yarn thus formed while oil is applied thereto.

[(c)] (*f*) One end of 80/1 cotton yarn to which 16 turns of Z-twist per inch have been imparted, one end of 70 denier nylon stretch yarn to which two and one-half turns of Z-twist per inch has been imparted and one end of 70 denier nylon stretch yarn to which two and one-half turns of S-twist per inch has been imparted are all plied together during which two and one-half turns of S-twist per inch in imparted thereto and during which the composite yarn thus formed is subjected to oil for lubricating the same.

A further experiment has been made in which one end of 50/1 cotton yarn (untwisted) has been plied with one end of 100 denier nylon stretch yarn. Also, in another instance, one end of 60/1 cotton yarn (untwisted) has been plied with one end of 100 denier nylon stretch yarn. In the latter two instances, it should be noted that the nylon stretch yarn has not been twisted other than the twisting operations which are normally necessary during the previous formation of the stretch yarn. The latter two composite yarns necessarily have an unbalanced twist *caused by the torque in the stretch yarn* which will [cause] *result in* spiraling of the resultant product woven therefrom.

In order to counteract this spiraling effect, [a No. 40/1] *the* cotton yarn *was twisted a sufficient number of turns in the opposite direction from the torque in the nylon stretch yarn* [was used to eliminate] *to counteract* the back twist of the nylon which would obviously eliminate spiraling of the fabric.

*As noted in the foregoing examples utilizing only one end of stretch nylon yarn, the amount of opposite direction twist in the cotton necessary to counteract the torque in the stretch nylon depends on the count of the cotton yarn and the amount of torque or twist in the nylon.* [In some instances, it has been found that the spiraling effect of the nylon stretch yarn can be eliminated by adding twist to the cotton, without imparting any additional twist in either direction to the nylon stretch yarn, which balances against the back twist of the nylon stretch yarn.]

Although a nylon stretch yarn is set forth in each of the aforementioned examples of the improved composite yarn, it is to be understood that the invention is not limited to "nylon" but includes other types of synthetic thermoplastic multi-filament [or monofilament] yarns treated by crimping, curling or twisting and characterized by a latent torque, curl, coil or spiral which either before or after knitting or weaving therefrom or both has stretchable characteristics. Also, although cotton yarn is specifically referred to in the claims and in the various embodiments of the improved yarn, it is to be understood that cotton, being a cellulosic yarn, may be substituted by other cellulosic yarn such as acetate and rayon.

It is apparent that the direction of twist may be in the opposite direction from that described in each instance in each embodiment of the improved yarn disclosed herein. *The terms "twist," "twisting" or "twisted" as used herein in reference to the direction of twist in the stretch yarn means the dominant twist or torque characteristic of the stretch yarn, and the terms "twist," "twisting" or "twisted" as used herein in reference to the amount of twist in the stretch yarn means the amount of final twist in the stretch yarn after processing, whether such final twist be the same as or more or less than the amount of original or "producer's twist" in the yarn.*

Figure 4:
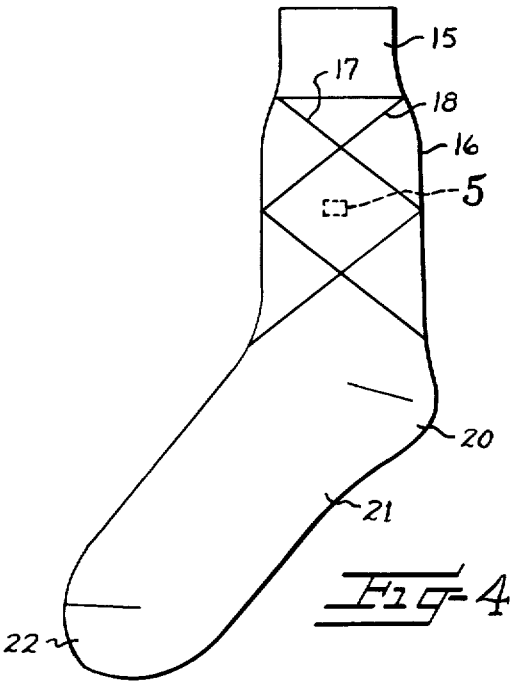
FIGURE 4 is a side elevation of a man's sock constructed in accordance with the improved method.

The man's hose or sock shown in FIGURE 4 is illustrative of one of the many different fabrics which may be produced from the improved yarn according to the present invention. The sock shown in FIGURE 4 may be knit entirely from the improved yarn, it may be of a single color throughout, or white, or it may be variegated areas knit from different colored yarns. In this instance, the sock includes a welt or top 15 which is preferably knit from the yarn of the present invention with an elastic or rubber yarn laid in the stitches thereof in the usual manner.

The stocking or sock also includes a leg 16 which is shown as being knit in an Argyle pattern wherein the various rectilinear areas are defined by diagonal lines 17, 18. The lines 17, 18 may be formed as wrap strips or they may be in the form of sutures at the junctures of adjacent rectilinear areas and wherein some of said rectilinear areas may be knit of different colored yarns than others and wherein the different colored yarns are made according to the present process. The sock or stocking in FIGURE 4 also includes the usual heel 20, foot 21 and toe 22 which are knit in a conventional well known manner and which are preferably knit from one or more embodiments of the improved yarn.

Figure 5:
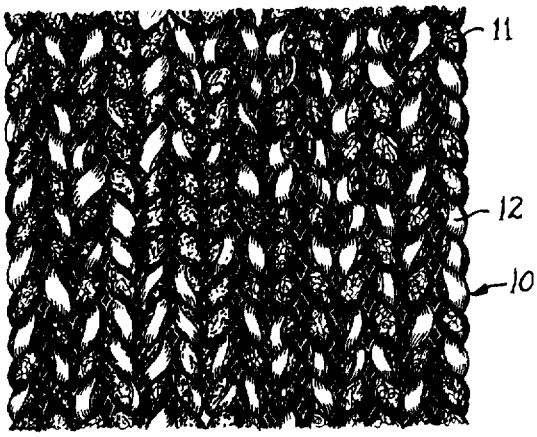
FIGURE 5 is a greatly enlarged view of a portion of fabric, such as that area defined by the broken lines and indicated at 5 in FIGURE 4, showing the embossed or crinkled appearance of the fabric as produced from the improved yarn.

The illustration in FIGURE 5 shows a portion of the fabric as it actually appears and wherein the cotton yarn is indicated at 12, the stretch yarn is indicated at 11 and the composite yarn formed by wrapping the cotton yarn 12 around the stretch yarn 11 is indicated broadly at 10. Because of the cotton yarn 12 being loosely wrapped around the stretch yarn 11, the cotton yarn 12 stands out at randomly spaced areas or at portions of most of the stitches so as to produce an embossed or glazed effect in the finished fabric or so the finished fabric has a pleasingly rough texture and has the hand, feel and appearance of cotton fabric, although a substantial percentage of the fabric is formed from the stretch yarn 11.

It is thus seen that I have provided an improved composite yarn and method of making the same wherein the composite yarn is formed from pre-twisted cotton and stretchable synthetic thermoplastic yarns which have been plied or doubled in a novel manner to wrap the cotton yarn around the thermoplastic stretch yarn and which yarn and the fabric knit or woven therefrom has the hand, feel and appearance of cotton yarn with substantial stretchable characteristics.

In the drawings and specification there have been set forth preferred embodiments of the present invention and, although specific terms are employed, they are used in a generic and descriptive sense only and not for purposes of limitation, the scope of the invention being defined in the claims.

I claim:

[1. That method of making a composite stretch yarn which includes twisting at least one end of cellulosic yarn a relatively few turns per inch in one direction, twisting at least one end of pre-treated stretch thermoplastic yarn of from 50 to 300 denier a substantially lesser number of turns than, and in the opposite direction from, the turns imparted to the cellulosic yarn, and then doubling the cellulosic and thermoplastic yarns while imparting a lesser number of turns per inch thereto than was originally imparted to the cellulosic yarn.]

[2. A knitted fabric knit with the composite yarn formed according to the method of claim 1.]

[3. That method of making a composite stretch yarn from cellulosic yarn and continuous filament thermoplastic yarn which has been twisted, heat-set and then untwisted which includes twisting at least one end of said cellulosic yarn a relatively few turns per inch in one direction, twisting at least one end of said thermoplastic yarn a substantially lesser number of turns than, and in the opposite direction from, the turns imparted to the cellulosic yarn, and then doubling the cellulosic and thermoplastic yarns while imparting a lesser number of turns per inch thereto than was originally imparted to the cellulosic yarn, but a sufficient number of turns to loosely wrap the cellulosic yarn around the thermoplastic yarn and while maintaining the cellulosic yarn under approximately 5 grams lesser tension than the tension in the thermoplastic yarn.]

[4. A knitted fabric knit with the composite yarn formed according to the method of claim 3.]

5. That method of making a composite stretch yarn from cotton yarn and continuous filament thermoplastic yarn which has been twisted, heat-set and then untwisted which includes twisting at least one end of said cotton yarn [a relatively few turns] *at least five turns* per inch in one direction, twisting at least one end of said thermoplastic yarn a [substantially] lesser number of turns than, and in the opposite direction from, the turns imparted to the cotton yarn, and then doubling the cotton and thermoplastic yarns while imparting a lesser number of turns per inch thereto than was originally imparted to the cotton yarn, but a sufficient number of turns to loosely wrap the cotton yarn around the thermoplastic yarn while maintaining the cotton yarn under less tension than the tension in the thermoplastic yarn.

6. A [knitted] fabric [knit with] *made from* the composite yarn formed according to the method of claim 5.

7. That method of making a composite stretch yarn from cotton yarn and continuous filament thermoplastic yarn which has been twisted, heat-set and then untwisted which includes twisting at least one end of said cotton yarn [a relatively few] *at least five* turns per inch in one direction, twisting at least one end of said thermoplastic yarn a [substantially] lesser number of turns than, and in the opposite direction from, the turns imparted to the cotton yarn, and then doubling the cotton and thermoplastic yarns while imparting a lesser number of turns per inch thereto than was originally imparted to the cotton yarn, but a sufficient number of turns to loosely wrap the cotton yarn around the thermoplastic yarn and while maintaining the cotton yarn under approximately 5 grams lesser tension than the tension in the thermoplastic yarn.

8. A [knitted] fabric [knit with] *made from* the composite yarn formed according to the method of claim 7.

9. That method of making a composite stretch yarn having a predominately cotton texture and appearance which includes [twisting] *providing* at least one end of cotton yarn having a count of from 12 to 80 [a relatively few] *and having up to twenty* turns per inch in one direction, [twisting] *providing* at least one end of nylon yarn of from 50 to 300 denier, which has previously been processed to induce stretch characteristics therein[, a substantially lesser number of turns than, and] *and to impart a torque thereto* in the opposite direction from[,] the turns imparted to the cotton yarn, and then doubling the cotton and nylon yarns while imparting a lesser number of turns per inch thereto than was originally imparted to the cotton [strand] *yarn*.

10. A [knitted] fabric [knit with] *made from* the composite yarn formed according to the method of claim 9.

[11. A method of making a composite stretch yarn which includes twisting a cotton yarn, having a count of from 12 to 80, up to 20 turns per inch in a first direction, twisting at least one end of previously treated synthetic thermoplastic stretch yarn approximately one half the number of turns imparted to the cotton yarn per inch and in the opposite direction from said first direction, and then plying the cotton yarn with the synthetic thermoplastic stretch yarn while imparting approximately the same number of turns of twist thereto as was imparted to the synthetic thermoplastic stretch yarn and in the same direction as the synthetic thermoplastic stretch yarn to produce a composite yarn having a predominately cotton feel and appearance.]

[12. A knitted fabric knit with the composite yarn formed according to the method of claim 11.]

[13. A method of making a composite stretch yarn which includes twisting a cellulosic yarn, having a count of from 12 to 80, up to 20 turns per inch in a first direction, twisting at least one end of previously treated synthetic thermoplastic stretch yarn of from 50 to 300 denier approximately one half the number of turns imparted to the cellulosic yarn per inch and in the opposite direction from said first direction, and then plying the cellulosic yarn with the synthetic thermoplastic stretch yarn while imparting approximately the same number of turns of twist thereto as was imparted to the synthetic thermoplastic stretch yarn and in the same direction as the synthetic thermoplastic stretch yarn.]

[14. A stretchable fabric knit with the composite yarn formed according to the method of claim 13.]

15. A composite stretch yarn comprising one end of cotton material having a given [relatively few turns of] *number of turns of twist per inch, in the range of 5 to 20,* [Z-twist per inch] imparted thereto, two ends of nylon material previously treated so that each end has inherent stretchable characteristics and *an oppositely directed torque from that in the other end of nylon material and which ends of nylon* [which] have subsequently been plied at substantially less than said given few turns of twist per inch [and in an S-twist], and all three ends being plied and twisted at approximately the same number of turns of [S-twist] *twist* per inch as that at which the two ends of nylon are twisted.

16. A stretchable fabric [knit with] *made from* the composite yarn *of* [according to] claim 15.

17. A yarn according to claim 15 wherein the cotton material is approximately sixteen count, dyed and the given few turns is approximately seven, wherein each end of nylon material is approximately one-hundred denier, dyed and the two ends of nylon material are plied at approximately three and one-half turns per inch, and wherein all three ends are plied at approximately two and one-half turns per inch.

18. A stretchable fabric [knit with] *made from* the composite yarn *of* [according to] claim 17.

19. A composite yarn according to claim 15 wherein the cotton material is approximately eighty count, said given few turns is approximately sixteen, wherein each end of nylon material is approximately one-hundred denier and the two ends of nylon material are plied at approximately two and one-half turns per inch, and wherein all three ends are plied at approximately two and one-half turns per inch.

20. A stretchable fabric [knitted] *made* from [a] *the* composite stretch yarn [formed according to the method] of claim 19.

21. A composite stretch yarn formed from a twisted *cotton* [cellulosic] strand, at least one strand of nylon stretch yarn twisted a lesser number of turns per inch[,] than the *cotton* [cellulosic] strand[, following the twist inserted therein during the formation of the stretch yarn, and being and twisted] in the opposite direction from that of the [cellulosic] *cotton* strand, and the [cellulosic] *cotton* strand and nylon yarn being intertwisted a [relatively few] *lesser number of* turns per inch *and in the opposite direction than the cotton strand.* [In the same direction in which the nylon yarn was last twisted prior to the intertwisting of the cellulosic strand and the nylon yarn.]

22. An improved stretchable fabric [knit] *made* with a composite yarn according to claim 21.

23. A composite stretch yarn comprising one end of cotton having from 5 to 20 turns of Z-twist per inch therein and being from 12 to 80 count size, at least one end of stretch synthetic thermoplastic strand material having a size of from 50 to 300 denier and having from zero to 4 turns of S-twist per inch therein independently of the twist inserted in the stretch yarn during the process involved in the forming of the stretch yarn, and the ends of cotton and stretch synthetic thermoplastic strand material being intertwisted approximately two and one-half turn of S-twist per inch.

24. An improved stretchable fabric [knit with] *made from* the composite yarn [according to] *of* claim 23.

25. A composite stretch yarn comprising one end of cotton having from 5 to 20 turns of S-twist per inch therein and being from 12 to 80 count size, at least one end of stretch synthetic thermosplastic stretch yarn having a size of from 50 to 300 denier and having from zero to 4 turns of Z-twist per inch therein independently of the twist inserted in the synthetic stretch yarn during the process involved in the forming of the synthetic stretch yarn, and the ends of cotton and synthetic thermoplastic stretch yarn being intertwisted approximately two and one-half turns of Z-twist per inch.

26. An improved stretchable fabric [knit with a] *made from the* composite yarn [according to] *of* claim 25.

[27. A composite stretch yarn comprising one end of cellulosic material having from 5 to 20 turns of twist per inch therein in one direction and being from 12 to 80 count size, at least one end of synthetic thermoplastic strand material having inherent stretch characteristics and having a size of from 50 to 300 denier and also having from zero to 4 turns of twist per inch in the opposite direction from said one direction, independently of any twist inserted in the thermoplastic material during the process involved in inducing said inherent stretch characteristics therein, and the ends of cellulosic material and synthetic thermoplastic strand material being intertwisted approximately two and one-half turns per inch in said opposite direction.]

[28. An improved stretchable fabric knit with a composite yarn according to claim 27.]

[29. A composite stretch yarn comprising one end of cotton having from 5 to 20 turns of twist per inch therein in one direction and being from 12 to 80 count size, at least one end of stretch nylon having a size of from 50 to 300 denier and having from zero to four turns of twist per inch therein in the opposite direction from the cotton and independently of the twist inserted in the stretch nylon during the process involved in inducing stretch characteristics in the nylon, and the ends of cotton and stretch nylon being intertwisted approximately two and one-half turns per inch in said opposite direction.]

[30. A stretchable fabric knit with the composite yarn formed according to claim 29.]

31. A composite stretch yarn comprising one end of cotton material having from 5 to 20 turns of [Z-twist] *twist* per inch imparted thereto, two ends of nylon previously treated so that each end has inherent stretchable characteristics, said two ends of nylon being plied together at from 2 to 4 turns of [S-twist] *twist* per inch, and all three ends being plied together at approximately two and one-half turns of [S-twist] *twist* per inch.

32. A stretchable fabric [knit with] *made from* the composite yarn *of* [formed according] to claim 31.

33. A composite stretch yarn comprising one end of approximately eighty count cotton material having approximately sixteen turns of [Z-twist] *twist* per inch imparted thereto, two ends of approximately seventy denier nylon material previously treated so that each end has inherent stretchable characteristics and each of which has approximately two and one-half turns of twist per inch imparted thereto independently to the other and wherein each of the nylon ends is twisted in the opposite direction from the other, and all three ends being plied and twisted at approximately two and one-half turns of [S-twist] *twist* per inch.

34. An improved stretchable fabric [knit with a] *made from the* composite yarn [formed according to] *of* claim 33.

35. A composite yarn comprising one end of approximately fourteen count cotton having approximately seven turns of Z-twist per inch therein intertwisted at approximately two and one-half turns of S-twist per inch with one end of approximately one-hundred denier nylon stretch yarn which has been previously twisted at approximately two and one-half turns of S-twist per inch.

36. An improved stretchable fabric [knit with a] *made from the* composite yarn [formed according to] *of* claim 35.

37. A composite stretch yarn comprising one end of dyed cotton yarn having a size of from 40 to 60 count and also being twisted approximately 16 turns of Z-twist per inch and being loosely intertwisted at approximately two and one-half turns of S-twist per inch with one end of approximately 100 denier dyed stretch nylon, yarn to which approximately three and one-half turns of S-twist per inch has been imparted subsequent to the processing of the nylon yarn to give it stretch characteristics.

38. An improved stretchable fabric [knit with a] *made from the* composite yarn [formed according to] *of* claim 37.

[39. A composite stretch yarn comprising two ends of approximately 100 denier thermoplastic stretch material plied together at two and one-half turns of S-twist per inch and being plied with a single end of 80 count cotton previously twisted approximately 16 turns of Z-twist per inch and the two ends of stretch material being plied with the single end of cotton material at approximately two and one-half turns of S-twist per inch.]

[40. An improved stretchable fabric knit with a composite yarn formed according to claim 39.]

41. A composite stretch yarn comprising one end of No. 80 count [cellulosic] *cotton* material having approximately 16 turns of Z-twist per inch, two ends of approximately 70 denier synthetic thermoplastic stretch material, each of the two ends of stretch material having approximately two and one-half turns of twist per inch therein with one end of the stretch material being twisted in one direction and the other end of stretch material being twisted in the other direction and the two ends of stretch material being plied with the [cellulosic] *cotton* material at approximately two and one-half turns of [S-twist] *twist* per inch.

42. An improved stretchable fabric [knit with a] *made from the* composite yarn [formed according to] *of* claim 41.

*43. A composite yarn comprising an end of cotton yarn having a count of from 12 to 80 and twisted from 5 to 20 turns in one direction and at least one end of stretch thermoplastic yarn of from 50 to 300 denier having a latent torque in the opposite direction from the twist in the cotton yarn, and the ends of cotton and thermoplastic yarn being plied together with less twist than that imparted to the cotton yarn.*

*44. A fabric made from the yarn formed according to claim 43.*

*45. A composite stretch yarn comprising one end of cotton yarn twisted from 5 to 20 turns per inch in one direction, two ends of stretchable thermoplastic yarn, one end of which is twisted in the same direction as the cotton yarn and the other end of which is twisted in the opposite direction from the cotton yarn, the two ends of stretchable thermoplastic yarn being plied together with a lesser number of turns per inch than the cotton yarn, and the cotton yarn and the stretchable thermoplastic yarn being plied together by wrapping the cotton yarn around the stretchable thermoplastic yarn while imparting a lesser number of turns per inch to the composite yarn than that previously imparted to the cotton yarn.*

*46. A fabric made from the yarn of claim 45.*

*47. That method of making a composite stretch yarn which includes plying at least one end of cotton yarn twisted in one direction with at least one end of stretch thermoplastic yarn under tension and having a torque in the opposite direction from the twist in the cotton yarn while imparting a lesser number of turns per inch to the composite yarn than was originally imparted to the cotton yarn.*

*48. A fabric made from the composite yarn formed according to the method of claim 47.*

References Cited in the file of this patent or the original patent

UNITED STATES PATENTS

| | | |
|---|---|---|
| 2,006,542 | Dreyfus | July 2, 1935 |
| 2,019,185 | Kagi | Oct. 29, 1935 |
| 2,477,652 | Robbins | Aug. 2, 1949 |
| 2,711,627 | Leath et al. | June 28, 1955 |

OTHER REFERENCES

Textile World, pages 94–97, June 1955.
Textile Industries, pages 124–127, July 1955.